(12) United States Patent
Sharma et al.

(10) Patent No.: US 10,997,623 B2
(45) Date of Patent: May 4, 2021

(54) ADVERTISEMENT RENDERING

(71) Applicant: ACCENTURE GLOBAL SOLUTIONS LIMITED, Dublin (IE)

(72) Inventors: Sanjay Sharma, New Delhi (IN); Derek Levesque, Trumbull, CT (US); Rupesh Kumar, Atlanta, GA (US); Keshav Rastogi, Gurgaon (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 443 days.

(21) Appl. No.: 15/811,262

(22) Filed: Nov. 13, 2017

(65) Prior Publication Data

US 2019/0087855 A1    Mar. 21, 2019

(30) Foreign Application Priority Data

Sep. 21, 2017 (IN) .............................. 201711033446

(51) Int. Cl.
*G06Q 30/02* (2012.01)
*G06N 7/00* (2006.01)

(52) U.S. Cl.
CPC ......... *G06Q 30/0244* (2013.01); *G06N 7/005* (2013.01); *G06Q 30/0202* (2013.01); *G06Q 30/0272* (2013.01)

(58) Field of Classification Search
CPC ....................................... G06Q 30/0207–0277
USPC .................................................... 705/14, 319
See application file for complete search history.

(56) References Cited

U.S. PATENT DOCUMENTS

| | | | |
|---|---|---|---|
| 2017/0064400 A1* | 3/2017 | Riegel | H04N 21/2743 |
| 2017/0278289 A1* | 9/2017 | Marino | G06T 11/60 |

* cited by examiner

*Primary Examiner* — Luis A Brown
*Assistant Examiner* — Richard G Reinhardt
(74) *Attorney, Agent, or Firm* — Mannava & Kang, P.C.

(57) ABSTRACT

A system selects a set of advertisement media associated with a product. A set of persistent advertisement media from the set of advertisement media is identified based on one or more tests. A Gaussian Bayesian (GB) network based on the set of advertisement media. A net persistence rate for each of the set of persistent advertisement media is determined based on the GB network. a competitor factor associated with another vendor of the product is computed based on one or more marketing parameters associated with the another vendor. A predicted sales (PS) value associated with each of the set of persistent advertisement media is determined. A persistent advertisement medium is selected in real time based on corresponding PS value. An advertisement is rendered on the selected persistent advertisement medium in real time for marketing the product.

9 Claims, 9 Drawing Sheets

ADVERTISEMENT RENDERING

PRIORITY

The present application claims priority under 35 U.S.C. 119(a)-(d) to Indian patent application number 201711033446, having a filing date of Sep. 21, 2017, the disclosure of which is hereby incorporated by reference in its entirety.

BACKGROUND

Marketing of a product includes advertising the product through various advertisement media, such as, for example, the Internet, newspapers, television commercials, banner advertisements, and commercials on radio. In order to learn the impact of the advertising on the consumers, manufacturers or vendors of the product conduct routine surveys related to the product. Through these surveys, consumer feedback related to the product is gathered, and subsequently analyzed, for example, to learn about the impact of advertising through various advertisement media and to identify the sales generated through each of the advertisement media. Accordingly, the manufacturer or the vendor designs subsequent advertisement strategies for achieving maximum sales.

In a typical approach of learning about the impact of advertising through various advertisement media, consumer surveys may be conducted. However, such surveys do not represent an accurate dataset related to the product and may result in incorrect analysis of the sales of the product. Also, the analysis mostly project short term impacts of advertising through various advertisement media and in that, the approach is limited. Furthermore, colleting raw data for the analysis in the form of consumer surveys is a tedious task in itself.

Some of the other technical limitations in currently used systems include not having the ability to analyze the long term impact of advertisement campaigns and the impact of competitors' advertisement campaigns on the sales of products. In addition, such systems do not include the capability to modify ad campaigns and particular advertisements themselves in real time based on the analysis of the long term impact of advertisement campaigns and the impact of competitors' advertisement campaigns.

BRIEF DESCRIPTION OF DRAWINGS

The embodiments are described in detail in the following description with reference to the following figures. The figures illustrate examples of the embodiments.

DETAILED DESCRIPTION

Figure 1A:
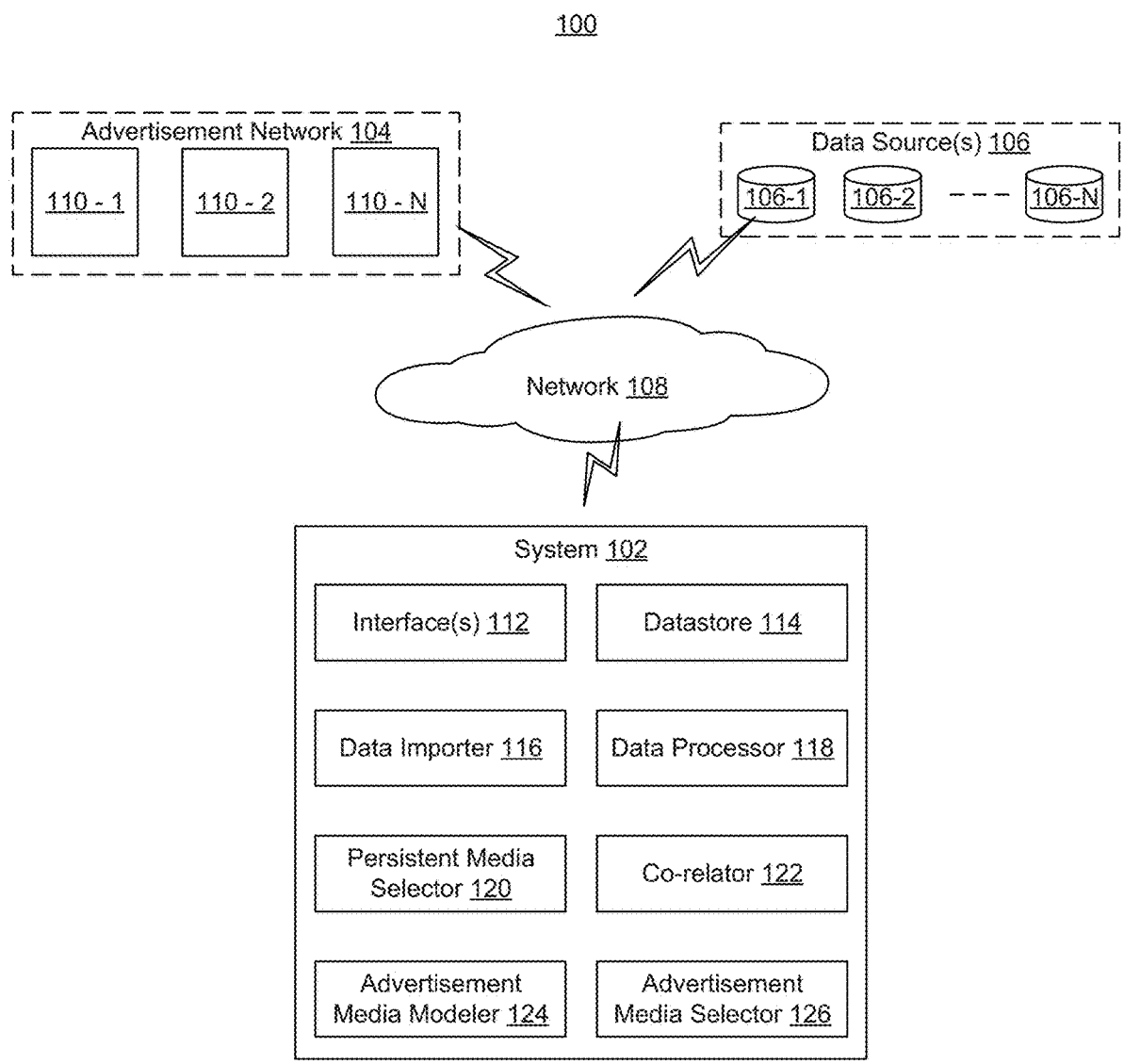
FIG. 1(a) illustrates an example network implementation of a system, in accordance with the present disclosure.

For simplicity and illustrative purposes, the embodiments of the disclosure are described by referring mainly to examples thereof. Also, numerous specific details are set forth in order to provide a thorough understanding of the embodiments. It will be apparent however, to one of ordinary skill in the art, that the embodiments may be practiced without limitation to one or more of these specific details. In some instances, well known methods and structures have not been described in detail so as not to unnecessarily obscure the description of the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Manufacturers or vendors of a product run advertisement campaigns of their products through various advertisement media, such as, for example, newspapers, television, radio, banner ads, and the like. It may be important for the manufacturers/vendors to learn about the success of the advertisement campaigns. That is, manufacturers/vendors may want to know if the advertisement campaign are impacting the sales of the product and if so, by how much. A measure of the effectiveness of an advertisement campaign may include determining the impact of each individual advertisement media used as part of the advertisement campaign.

According to aspects of the present subject matter, marketing and advertisement data associated with a product may be obtained, and subsequently analyzed using a system implementing machine learning algorithms. During the analysis, factors such as brand decay and indirect contribution of advertisement media, and competitor marketing factor may be determined for identifying persistent advertisement media having long term impact on the sales of the product. The brand decay may be understood as the effect of advertisement in driving sales of a product post removal of the advertisement from a particular advertisement medium. The indirect contribution of an advertisement medium may be understood as the indirect contribution of the advertisement medium in driving the sales of the product. For instance, National TV advertisement may lead to an online search for the product, thereby indirectly affecting sales of the product. The competitor factor may be understood as impact on sales due to advertisement and marketing done by competitor vendors.

For each of the persistent advertisement media, predicted sales (PS) value or return on investment (ROI) value may be computed and accordingly, steps for optimizing advertisement and marketing of the product may be performed. For instance, based on the PS value or ROI value, one of the persistent advertisement media may be selected for real time rendering of an advertisement related to the product.

Furthermore, according to the present disclosure, the marketing and advertisement data is collected digitally. This may lead to the collected dataset to be sufficiently large and thus accurate. Additionally, the, collection of such a dataset is less tedious and less cumbersome as opposed to manual collection of data through means of consumer surveys. Furthermore, the present disclosure provides a scalable approach of integrating with existing advertisement networks, thereby facilitating real time rendering of the advertisement based on the analysis of the advertisement data.

FIG. 1(a) illustrates a network environment 100 implementing a system 102 for rendering advertisements, in accordance with an example embodiment of the present subject matter. In an example, the system 102 may be implemented by a vendor or a manufacturer of a product seeking to learn the impact of advertising done on various advertisement media, such as, for example, Internet, print, television, and radio. System 102 may also be implemented by a third party that analyzes the impact of advertisement campaigns on the sales of products.

The system 102, in an example, is connected to an advertisement network 104 and a plurality of data sources 106, through a network 108. The system 102 may be implemented in one or more computing devices, such as a server, a workstation computer, a personal computer, a tablet, a laptop, a desktop computer, a smartphone, and the like. The advertisement network 104 may be understood as a network comprising a plurality of advertisement media, such as, for example, print, television, radio, Internet searches (paid and unpaid), Internet advertisements, email advertisements, banner advertisements, advertisements on vehicles, and the like, depicted by, 110-1, 110-2, ..., 110-N. The data sources 106 includes at least one of Public data, Social media data, and audience data, represented by 106-1, 106-2, ..., 106-N. Example public data may include weather data, national holiday calendar data, unemployment data, data associated with enterprises and manufacturers, media advertisement data, and the like. Example Social media data may include, tweets, posts, article sharing activity, event creation activity, and the like. Example audience data may include information associated with consumers, feedback data received from consumers, and the like.

The network 108 may be a cellular network, a broadband network, a telephonic network, an open network, such as the Internet, or a private network, such as an intranet and/or the extranet, or any combination thereof. In other examples, the network 108 can be any collection of distinct networks operating wholly or partially in conjunction to provide connectivity between the system 102, the advertisement network 104, and the data source(s) 106. Furthermore, the network 108 may include and/or support one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and may be further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

The system 102, in an example, includes an interface(s) 112, datastore 114, a data importer 116, a data processor 118, a persistent media selector 120, a co-relator 122, an advertisement media selector 124, and an advertisement media selector 126. The interface(s) 112 may include one or more of audio, video, input/output interfaces. The datastore 114 may be a storage medium for storing data, processes, predefined rules, algorithms, software, operational instructions, internal data, external data, and other product related data, such as sales data, advertisement data comprising advertisements related to the product, and the like.

In operation, a data importer 116 of the system 102 may obtain product data related to the product from the data sources 106 over the network 108. In another example, the data importer 116 may obtain the product data from an external storage device, for example, a pen drive, connected to the system 102 through the interface(s) 112. The product data may include data indicative of advertisement and sales of the product. For instance, the product data may include at least one of a gross rating point (GRP) associated with different advertisement media used for marketing the product. In an example, the data importer 116 may store the product data in the datastore 114 for further analysis.

Once the product data is obtained, a data processor 118 of the system 102 may identify a plurality of advertisement media associated with the product based on the product data. In other words, the product data is analyzed and advertisement media related to advertisement and sales of the product are identified. Examples of the advertisement media may include, but are not limited to, newspaper ads, social media posts and ads, print ads, e-mail advertisement broadcasts, radio, television, advertisement banners, advertisements posted on web pages, advertisement through paid searches, and the like.

Once the plurality of advertisement media is identified, the data processor 118 applies a regression technique on the identified plurality of advertisement media for selecting a set of advertisement media. In an example, the set of advertisement media may include those advertisement media which significantly impacts the sales of the product.

Based on the set of advertisement media, a persistent media selector 120 of the system 102 identifies a set of persistent advertisement media and a co-relator 122 of the system 102 generates a Gaussian Bayesian (GB) network. The set of persistent advertisement media includes advertisement media having long term equilibrium relationship with sales of the product. In other words, the set of persistent advertisement media includes those advertisement media which have a long term impact on the sales of the product.

The GB network generated is indicative of the relationships (represented by arcs) between the set of advertisement media and the sales of the product. The relationship between an advertisement medium and the sales of the product may be a direct one, or an indirect one. Also, at an instant, the advertisement medium may have more than one relationship with the sales. As an example of direct relationship, the national TV may influence the sales of a product directly through an advertisement aired on the National TV. As an example of indirect relationship, an advertisement done on the National TV may prompt a user to investigate further about the product through online searching. The online search may result in a sale of the product and thus, in this manner, the National TV may drive the sale of the product indirectly as well.

Figure 5:
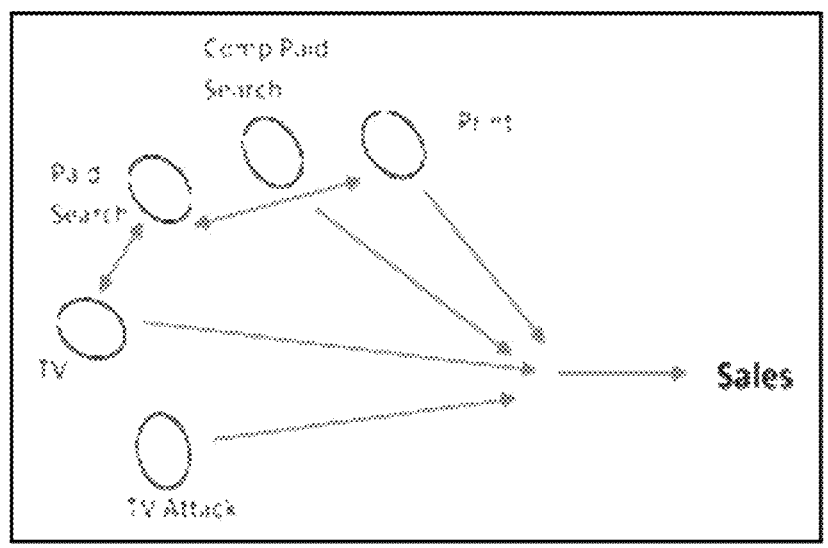
FIG. 5 illustrates an example of a Gaussian Bayesian network, in accordance with the present disclosure.

For generating the GB network, the co-relator 122 obtains the set of advertisement media and predefined lists stored in the datastore 114. The predefined lists may include a white list and a black list defining relationships between the advertisement media and the sales. For instance, a relationship from National TV to Sales is logical, and is thus included in the white list. Whereas, a relationship from Sales to National TV is not logically correct, and is thus included in the black list. Thus, based on the white list and the black list, the co-relator 122 defines the relationships between the advertisement media and the sales. Thereafter, the co-relator 122 may run a hill climbing algorithm and stepwise regression for addition/deletion of advertisement media may be performed. Thus, a plurality of GB networks may be generated. In an example, the co-relator 122 may select a GB network having the lowest Bayesian Information Criterion (BIC) value. An exemplary GB network is illustrated in FIG. 5, described below.

Once the set of persistent variables is identified and the GB network is generated, the advertisement media modeler 124 determines a predictive sales (PS) value for each of the persistent advertisement media. The PS value of an advertisement medium may be indicative of a number of the products predicted to be sold by a further time period as a result of advertisement/marketing through the advertisement medium. For determining the PS value, the advertisement media modeler 124 computes a net persistence rate for each of the set of persistent advertisement media and a competitor factor associated with another vendor of the product.

For computing the net persistence rate associated with a persistent advertisement medium, the advertisement media modeler 124 at first computes short-term contribution of each of the set of advertisement media. using equation 1 and 2 provided below.

$$Sales_{(t)} = a_0 + a_1 Sales_{(t-1)} + a_2 TV_{(t)} + a_3 \Delta TV_{(t)} + a_4 Search_{(t)} + a_5 Print_{(t)} + a_6 \Delta Print_{(t)} + \theta Z_{(t)} + a_7 TV Attack + a_8 CompPaidSearch + \epsilon_{(t)} \quad (1)$$

$$Search_{(t)} = b_0 + b_1 Search_{(t-1)} + b_2 TV_{(t)} + b_3 \Delta TV_{(t)} + b_4 Print_{(t)} + b_5 \Delta Print_{(t)} + \theta Z_{(t)} + \epsilon_{(t)} \quad (2)$$

where, $S_{(t)}$ and $S_{(t-1)}$ are sales at time t and t−1;

$a_o$ is the intercept, that is, sales when no advertising/marketing is done;

$b_o$ is the search intercept, i.e., sales through search when no advertising/marketing is done;

$a_n$ is the level coefficient for different advertisement media for direct path (n=1 to x);

$b_n$ is the level coefficient for different advertisement media for indirect path (n=1 to x);

Δ is the change in the sales from time t−1 to t (also referred to as difference coefficient); and $\epsilon_t$ is the error coefficient.

Equation 1 represents a direct path, i.e., direct relation between the sales and the advertisement media. Equation 2 represents an indirect path between the search advertisement medium and the sales. As can be seen, the sales through search is driven by other advertisement media as well.

Based on the equation 1 and 2, and advertisement data (Example table 1) below, the advertisement media modeler 124 generates both, direct and indirect, short-term contribution for each of the advertisement media depicted below in example tables 2 and 3, respectively.

EXAMPLE TABLE 1

| Variable | Dependent | Estimate | StdErr | tValue |
|---|---|---|---|---|
| $Sales_{(t-1)}$ ($a_1$) | Sales | 0.64 | 0.03 | 20.12 |
| National TV ($a_2$) | Sales | 112.29 | 34.44 | 3.26 |

EXAMPLE TABLE 1-continued

| Variable | Dependent | Estimate | StdErr | tValue |
|---|---|---|---|---|
| ΔNational TV ($a_3$) | Sales | 57.28 | 23.27 | 2.46 |
| Search ($a_4$) | Sales | 0.10 | 0.05 | 2.25 |
| Print ($a_5$) | Sales | 854.91 | 525.86 | 1.63 |
| ΔPrint ($a_6$) | Sales | 270.43 | 122.25 | 2.21 |
| TV Attack($a_7$) | Sales | −90.43 | 18.54 | −4.88 |
| IPhone | Sales | 2220.92 | 1162.97 | 1.91 |
| Comp Paid Search($a_8$) | Sales | −4.31 | 3.38 | −1.4 |
| $Search_{(t-1)}$ ($b_1$) | Search | 0.81 | 0.03 | 28.22 |
| National TV ($b_2$) | Search | 72.71 | 21.27 | 3.42 |
| ΔNational TV ($b_3$) | Search | 25.71 | 23.27 | 6.42 |
| Print ($b_4$) | Search | 842.09 | 541.44 | 1.56 |
| ΔPrint ($b_5$) | Search | 384.09 | 241.44 | 1.32 |

EXAMPLE TABLE 2

Direct Path

| Driver | R52 Contribution % |
|---|---|
| Comp Paid Search | −2.99% |
| IPhone | 4.20% |
| Search | 7.08% |
| National TV | 6.92% |
| Print | 4.08% |
| TV Attack | −0.42% |

EXAMPLE TABLE 3

Indirect Path: Search

| Search | R52 Contribution % | R52 Net Contribution % |
|---|---|---|
| National TV | 10.58% | 0.75% |
| Print | 6.24% | 0.44% | where R52 is the recent 52 weeks contribution.

The direct short term contribution of an advertisement medium, for example, National TV is calculated by adding the coefficients related thereto in the direct path (a2 and a3). The indirect short-term contribution of National TV may be computed by adding the co-efficients related thereto in the indirect path (b2 and b3). In an example, for an advertisement medium, such as, search, which includes indirect sales from other advertisement media, such as National TV and print, the share of the National TV and print may be deducted from the total sales of Search. Also, the indirect sales of the National TV is then added to the total sales of National TV.

In an example, the advertisement media modeler 124 may utilize a short term decay (example table 4) for determining the net short term contribution for the advertisement media (example table 5). In an example, the short term decay is based on the adstock and the power associated with the advertisement medium.

EXAMPLE TABLE 4

Short Term decay

| Description | Adstock | Power | Months of Complete decay |
|---|---|---|---|
| National TV | 0.6 | 0.7 | 9 |
| Print | 0.4 | 0.7 | 5 |
| Search | 0.4 | 0.8 | 4 |

EXAMPLE TABLE 5

Short Term R52 Total Net Contribution

| Variables | R52 Net Contri % |
|---|---|
| National TV | 8.71% |
| Search | 6.63% |
| Print | 5.88% |
| IPHONE | 4.20% |
| TV ATTACK | −0.42% |
| COMP PAID SEARCH | −2.99% |

On computing the net-short term contribution for each of the persistent advertisement media, the advertisement media modeler 124 computes a persistence rate for each of the persistent advertisement media using equation 3 provided below.

$$\text{Persistence Rate (persistent advertisement medium)} = \frac{\text{Difference\_Coeff}}{\text{Difference\_Coeff} + \text{Level\_Coeff}} \quad (3)$$

Based on equation 3 above, the advertisement media modeler 124 may compute a direct path persistence rate (example table 6) and an indirect path persistence rate (example table 7) for each of the persistent advertisement media.

EXAMPLE TABLE 6

Direct Path Persistence Rate Calculation

| Variable | Level Coeff | Difference Coeff | Persistence Rate |
|---|---|---|---|
| National TV | 112.29 | 57.28 | 34% |
| Print | 854.91 | 270.43 | 24% |

EXAMPLE TABLE 7

Indirect Path: Search Persistence Rate Calculation

| Variable | Level_Coeff | Difference_Coeff | Persistence_Rate |
|---|---|---|---|
| National TV | 72.71 | 25.71 | 26% |

Upon computing the direct path persistence rate and the indirect path persistence rate, the advertisement media modeler 124 may compute a net persistence rate (Example table 8) for each of the advertisement media using equation 4 below.

$$\text{Net Persistence Rate (persistent advertisement medium)} = \frac{\text{Short Term Net Contribution}}{\text{Contribution due to Persistence}} \quad (4)$$

For instance, for computing the net persistence rate of National television, the advertisement media modeler 124 may determine the net short term contribution due to national television and may compute the contribution due to persistence related to the national television (both direct and indirect). Accordingly, the advertisement media modeler 124 may determine the net persistence of the national TV (example table 8).

EXAMPLE TABLE 8

| Variable | Short Term R52 Net Contribution | Contribution Due to Persistence | Net_Persistence_Rate |
|---|---|---|---|
| National TV | 1,009,982 | 383,880 | 38% |
| Print | 427,636 | 56,077 | 13% |

Once the net persistence rate is determined, the advertisement media modeler 124 may compute the competitor factor associated with the another vendor. In an example, the competitor factor may be based on a first competitor model and a second competitor model. The first competitor model may be a media mix model, i.e., the first model may take into account the advertisement/marketing activity of the vendor, and may be determined using equation 5 provided below.

$$\text{Sales} = b_0 + b_1 \text{Media} + b_2 \text{Competitor} + b_3 \text{Controls} + \varepsilon \quad (5)$$

Here, Media denotes the marketing and advertising done by the vendor, and control denotes the other factor such as season sales, demographic factors, and the like. For instance, a sale season may increase the sales of the product or the location of a user may drive sales of a particular product. For instance, sales of a cold drink may be more in a warmer climate region as opposed to a cold climate region. Further, $b_2$ indicates the sales of the another vendor. Together, the variables of the equation 5 may be referred to as marketing variables, in an example. Based on equation 5 above, the media mix model may be determined (example table 9). In an example, the first competitor model may indicate the impact on the sales of the vendor due to the another vendor on a quarterly basis as depicted below in example table 9.

EXAMPLE TABLE 9

| | | Media Mix Model | |
|---|---|---|---|
| Year_Qtr | Sales | Contribution | % Contribution |
| 2014_Qtr2 | 336509 | −13753 | −4.10% |
| 2014_Qtr3 | 349629 | −15776 | −4.50% |
| 2014_Qtr4 | 440588 | −15945 | −3.60% |
| 2015_Qtr1 | 336954 | −14282 | −4.20% |

The second competitor model may be a model independent of the marketing and advertisement activity of the vendor, and may be referred to as the competitor only model. The competitor only model in an example, may be computed using equation 6 provided below.

$$\text{Sales} = b_0 + b_1 \text{Competitor} + b_2 \text{Controls} + \varepsilon \quad (6)$$

As can be seen, the sales are independent of the marketing or advertising activity of the vendor. An example table 10 depicting the quarterly sales based on the competitor only model is provided below.

EXAMPLE TABLE 10

| | | Competitor Model | |
|---|---|---|---|
| Year_Qtr | Sales | Contribution | % Contribution |
| 2014_Qtr2 | 336509 | −35236 | −10.50% |
| 2014_Qtr3 | 349629 | −36022 | −10.30% |
| 2014_Qtr4 | 440588 | −36810 | −8.40% |
| 2015_Qtr1 | 336954 | −39850 | −11.80% |

In an example, the advertisement media modeler 124 may perform a summation (Example Table 11) of the quarterly contribution of the another vendor from both the competitor only model and the media mix model.

EXAMPLE TABLE 11

| Year_Qtr | % Net Contri |
|---|---|
| 2014_Qtr2 | −6.4% |
| 2014_Qtr3 | −5.8% |
| 2014_Qtr4 | −4.7% |
| 2015_Qtr1 | −7.6% |

Subsequently, the advertisement media modeler 124 may determine an average of all the quarters to determine the competitor factor. In the aforementioned example tables, the competitor factor is −6.1%. The competitor factor of −6.1 takes into account the marketing/advertising activity of the vendor. As may be understood, the impact of the marketing/advertising done by the vendor, herein also referred to as brand equity, would persist for a time period and, therefore, an actual value (−6.1%) of the competitor factor would not be attained instantaneously. Considering the brand equity, the advertisement media modeler 124, in an example, may determine a time period after which the competitor factor attains its full value. An example case is described below with the help of example table 12.

EXAMPLE TABLE 12

| Driver | Adstock | No Of weeks taken to reach 6% | weeks | Competitor Impact |
|---|---|---|---|---|
| National TV | 0.6 | 10 | week 1 | −6.10% |
| National TV | 0.6 | | week 2 | −3.66% |
| National TV | 0.6 | | | |
| National TV | 0.6 | | | |

EXAMPLE TABLE 12-continued

| Driver | Adstock | No Of weeks taken to reach 6% | weeks | Competitor Impact |
|---|---|---|---|---|
| National TV | 0.6 | | week 10 | −0.06% |
| Print | 0.4 | 7 | week 1 | −6.10% |
| Print | 0.4 | | week 2 | −2.44% |
| Print | 0.4 | | | |
| Print | 0.4 | | | |
| Print | 0.4 | | week 7 | −0.02% |

In an example, the advertisement media modeler 124 computes the time period after which the competitor factor would reach its full value based on the adstock value associated with the persistent advertisement medium. Thus, as illustrated above in the example table 12, for computing the time period for National TV, corresponding adstock factor of 0.6 is considered. At first, the advertisement media modeler 124 determines the adstock in percent form. Thus, the adstock factor of 0.6 is converted to 60%. Subsequently, the advertisement media modeler 124 iteratively computes an adstock percent value of the competitor factor, i.e., 60 percent of 6.1%, till a time period the competitor factor becomes almost zero. Thus, as can be seen above, by week 10, the competitor factor nears zero value. Thus, the advertisement media modeler 124 determines 10 weeks to be the time period at which the competitor factor would attain its full value. As may be gathered, the adstock is indicative of the impact of an advertisement medium on the consumers. Thus, factoring in the adstock accounts for the brand equity of the vendor. By performing this process for all the advertisement media, the advertisement media modeler 124 takes into account the brand equity achieved due to the persistent advertisement media.

As mentioned above, the advertisement media modeler 124 computes the PS value based on the net persistent rate associated with each of the set of persistent advertisement media and the competitor factor. In addition to the aforementioned factors, the advertisement media modeler 124, in an example, utilizes sales data associated with the product. The sales data may be understood as data indicative of a number of the products sold during a defined time period due to the marketing done through an advertisement medium. The computation of the PS value is described in conjunction with example table 13 and example table 14, provided below.

EXAMPLE TABLE 13

| Variable | Persistence Rate | R52_Net_Contribution | Number of weeks | Weekly Average Contribution | Weekly Persistence Contribution |
|---|---|---|---|---|---|
| National TV | 38% | 1,009,982 | 52 | 19,423 | 7,381 |
| Print | 13% | 427,636 | 52 | 8,224 | 1,069 |

Example table 13, illustrated above, includes one or more persistent advertisement media, their corresponding persistence rates, their corresponding Net contribution to sales for a defined time period, their weekly contribution to sales, and weekly contribution due to persistence.

EXAMPLE TABLE 14

| Variable | Net Persistence Rate | R52 Contri | Year1 | Year2 | Year3 | Contri Realized in 3 Years | % Contri Realized in 3 years with decay | % Contri Realized in 3 years (If No Decay) |
|---|---|---|---|---|---|---|---|---|
| National TV | 38% | 1,009,982 | 327,054 | 239,216 | 151,377 | 717,648 | 71% | 114% |
| Print | 13% | 427,636 | 47,865 | 35,010 | 22,154 | 105,030 | 25% | 39% |

Example table 14, illustrated above, includes one or more persistent advertisement media, their corresponding persistence rates, their corresponding Net contribution to sales for a defined time period, their annual sales due to persistence for subsequent years, their sales for a further period (3 years herein) with persistence (decay) and without persistence.

For computing the PS value associated with an advertisement medium (National TV), the advertisement media modeler 124 at first, computes a unit persistence contribution (Weekly persistence contribution (7381), table 13) associated with the advertisement medium based on a net contribution (R52_Net_Contribution (1,009,982), table 13) associated with the advertisement medium, the defined time period (52 weeks, table 13, and the net persistence rate (38%, table 13).

Thereafter, the advertisement media modeler 124 computes at least one variable decay value based on the competitor factor and the adstock value associated with the advertisement medium. By computing the decay values, the advertisement media modeler 124 takes into account the brand equity of the vendor. As described earlier with reference to example table 12, the competitor factor is achieved after some time period, first time period hereinafter. Thus, as may be understood, the further time period for which the PS value is computed may include the first time period, and a second time period.

As an example, referring to the example table 12, one or more variable decay values till $10^{th}$ week may be computed. For instance, the variable decay value for $2^{nd}$ week would be competitor factor for second week minus competitor factor for first week. Likewise, the decay factor for each week running upto the $10^{th}$ week may be calculated. An example table 15 depicting the variable decay value is provided below.

EXAMPLE TABLE 15

| Week Number | Initial Contribution | Variable Decay % | Net Competitor Effect Eroding Sales | Final Contribution |
|---|---|---|---|---|
| National TV | | | | |
| 1 | 7,381 | −0.06% | −5 | 7,376 |
| 2 | 7,376 | −0.10% | −8 | 7,369 |
| — | — | — | — | — |
| — | — | — | — | — |
| 10 | 6,734 | −6.10% | −411 | 6,324 |

On computing the variable decay values, the advertisement media modeler 124 computes at least one updated unit persistence contribution (Final contribution (7376), table 15) done during the first time period based on the unit persistence contribution and the variable decay value. In aforementioned example, to determine the contribution of sales for the first time period (10 weeks), the advertisement media modeler 124 may add the updated unit persistence contributions (final contribution from week 1 till week 10) for the first time period.

As may be understood, at the end of first time period, the competitor factor is at its full value (−6.1%). Thus, using the full value of the competitor factor, the advertisement media modeler 124 in an example, computes at least one further updated unit persistence contribution during the second time period (from $11^{th}$ week till end of third year). Thereafter, based on the contributions made during the first time period and the second time period, the advertisement media modeler 124 computes the PS value (Contri Realized in 3 Years (717,648), table 14) associated with the persistent advertisement medium. In an example, the advertisement media modeler 124 may determine the PS value in a percentage form (71%, table 14).

Thus, the advertisement media modeler 124 computes the PS value associated with all the persistent advertisement media. The computed PS values may be stored in the datastore 114 as sales prediction data.

In an example, a advertisement media selector 126 of the system 102 may access the sales prediction data to identify a persistent advertisement media whose predicted sales is maximum. Upon identifying the persistent advertisement medium, the advertisement media selector 126 may select, in real-time, the persistent advertisement medium for marketing the product. Subsequently, the advertisement media selector 126 may render, in real-time, an advertisement related to the product on the persistent advertisement medium. For instance, the advertisement media selector 126 may render the advertisement on the persistent advertisement medium 110-1. In an example, prior to rendering, the advertisement media selector 106 may modify the advertisement in real time based on the PS value. For instance, if the persistent advertisement medium has high PS values, the advertisement media selector 126 may modify the advertisement to remove excess graphics and advertisement. As a result, the data storage and computing overheads associated with the advertisement are reduced and yet acceptable sales of the product may be achieved.

As a part of rendering, the advertisement media selector 126 may also determine, in real-time, an advertisement platform, through which the advertisement may be rendered to the consumers. For instance, the advertisement media selector 126 may identify print as the persistent advertisement medium, and may further determine newspaper as the advertisement platform. The advertisement platform, in an example, may be determined based on the sales data.

As may be gathered from the foregoing description, the system 102 takes into account long run effects of advertisement media to determine predicted sales value or on in other words, a true return on investment (ROI) related to advertisements run on the advertisement media. Based on the determined PS value or ROI value, the system 102, in an example, may render advertisements in the marketplace in near real time, such as, for example, weekly, or monthly.

Figure 1B:
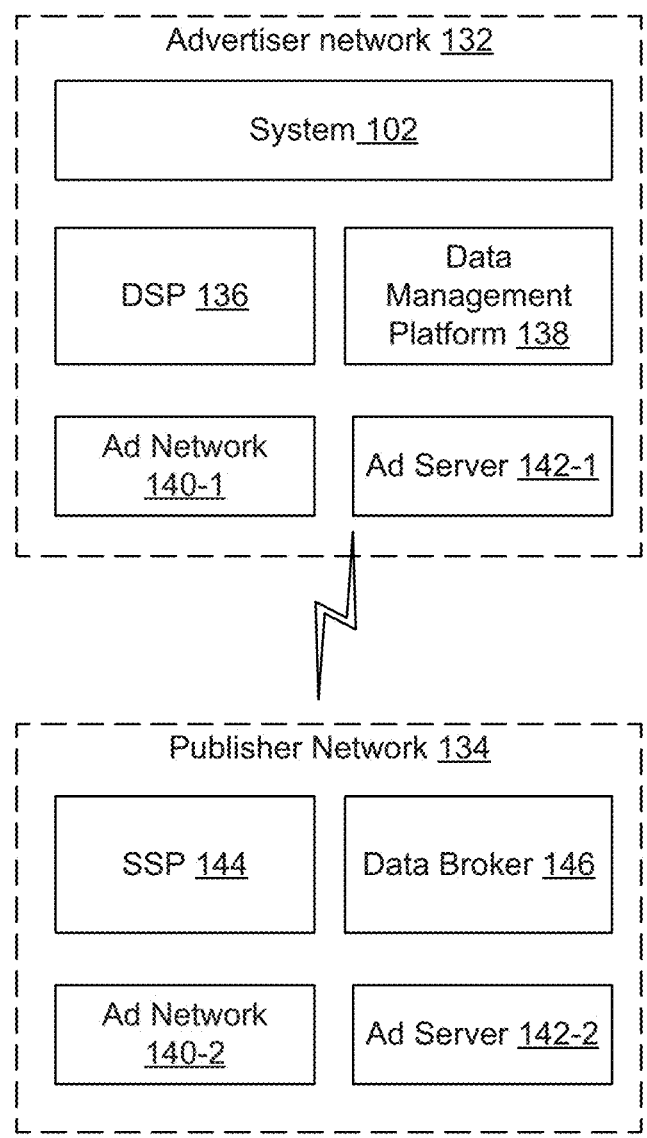
FIG. 1(b) illustrates an example network implementation of a system, in accordance with the present disclosure.

FIG. 1(b) illustrates a network environment 130 implementing the system 102 for optimizing advertisement rendering in a market place. The network environment 130 includes an advertiser network 132 and an a publisher network 134. The advertiser network 132 includes the system 102, a demand-side platform (DSP) 136, a data management platform 138, an ad network 140-1, and an ad server 142-1. The publisher network 134 includes a selling-side platform (SSP) 144, a data broker 146, an ad-network 140-2, and an ad server 142-2.

The publisher network 134, in an example, may be understood as a network of publishers, such as, for example, digital publishers, online publishers, offline publishers, rendering advertisement services to manufacturers, vendors, importers, exporters, enterprises, and the like. The advertiser network 132, in an example, may be understood as a network of advertisers (manufacturers, vendors, importers, exporters, enterprises, and the like) seeking to render advertisements through advertisement media provided by the publisher network 134. Although not shown in the figure, either one or both, the advertiser network 132 and the publisher network 134 may include a right to bid (RTB) client for facilitating bidding related to purchase/sale of advertisement rights related to various advertisement media.

As can be seen from the figure, an advertiser may implement the system 102 for optimizing advertisement rendering on various advertisement media. In an example, the system 102 may determine the PS value or the ROI value related to the advertisement media in real time, that is, monthly, weekly, or every fortnight. Based on the determined PS value or ROI value, the system 102 may generate an expenditure model. The expenditure model may include information related to the plurality of advertisement media and corresponding PS or ROI value. Based on the expenditure model, in an example, the system 102 may generate instructions for bidding for advertisement rights for one or more advertisement media from the plurality of advertisement media. Once the instructions are generated, the system 102 may transmit the bids to the DSP 136 and the RTB client, for placing the bids with the SSP 144. Accordingly, the system 102 facilitates the purchase of advertisement rights in real time, such as, for example, on a monthly or weekly basis.

As an example, the system 102 may facilitate purchase of advertisement rights for digital advertisement media, such as, for example, the Internet. Furthermore, in addition to selecting the advertisement medium, say, a website, the system 102, facilitates in determining an advertisement platform, say, for example, a standard banner or a video ad. In another example, the system 102 may facilitate the purchasing of the advertisement rights for offline advertisement media, such as, for example, National TV. In said example, the system 102 may facilitate in determining the time slots and other attributes, such as sponsored or non-sponsored advertisements for effective rendering of advertisements. Furthermore, for digital advertisement media like paid searches, the system 102 may facilitate the selection of keywords based on the analysis performed by the system.

Figure 2:
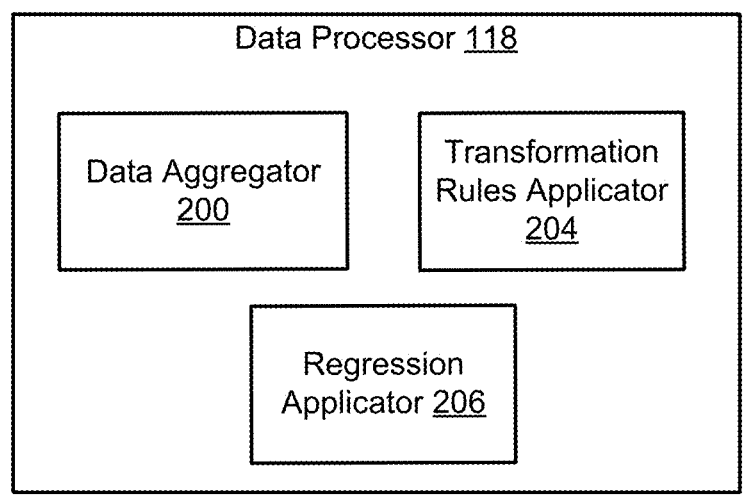
FIG. 2 illustrates an example of a data processor, in accordance with the present disclosure.

FIG. 2 illustrates a block diagram depicting components of the data processor 118. The data processor 118 includes a data aggregator 200, a transformation rules applicator 202, and a regression applicator 206. As mentioned above in the description of FIG. 1, the data processor 118 identifies the plurality of advertisement media and selects the set of advertisement media.

In operation, the data aggregator 200 processes the product data, i.e., performs at least one of a cleaning, ordering, and grouping operation on the product data. As a result, the product data, post the aforementioned operations, include data which is relevant for analyzing the sales and advertisement of the product, and is relatively noise free.

Post processing of the product data, the transformation rules applicator 204 applies one or more transformation rules, such as, for example, an adstock transformation rule and a power transformation rule, on the product data. Based on the adstock transformation rule, an adstock value of an advertisement media may be obtained. Similarly, based on the power transformation rule, a power value of an advertisement media may be obtained. The adstock value of an advertisement media may be understood as a value depicting the prolonged or lagged effect of marketing on purchase behavior of a consumer. The power related to an advertisement media may be understood as a power function computed based on the corresponding GRP value associated with the advertisement media. The power of the advertisement may be computed to account for diminishing sales returns. In an example, for each advertisement media, the transformation rules applicator 204 may compute an adstock value and a power value based on the GRP value associated with the advertisement media. based on a GRP value of each advertisement media. In an example, the transformation rules applicator 204 may perform iterative application of the transformation rules to obtain a plurality of combinations of advertisement media and sales. In an example, the transformation rules are applied based on a user input received through the interface 112. The user input, in an example, may include definitions related to the advertisement media. Further, in an example, the user input may include instructions or commands to select/modify/delete the aforementioned combinations. The user input, in an example, may be based on interactions between the different advertisement media.

Once the plurality of advertisement media is identified, the regression engine 206 applies the regression technique for identifying the set of advertisement media. In an example, if the advertisement media are in a continuous form, the regression applicator 206 may apply a Lasso regression technique. The lasso regression technique selects the significant advertisement media from the plurality of advertisement media based on model fit statistics, such as, for example, akaike's information criterion (AIC), R-squared ($R^2$), and the like. As an example, in the lasso regression technique, the regression applicator 206, at first, computes estimates and subsequently reduces the errors related thereto based on error reduction equation given below.

$$\hat{\beta} = \text{Min } \Sigma_i(y_i - \beta_j x_i)^2, \text{ constraint} = \Sigma_j|\beta_i| \leq t \quad \text{Error Reduction Equation}$$

Here $y_i$=actual data, $\beta_j x_i$=predicted data, $\beta_i$=estimate, and t=variable to control shrinkage of parameters.

Based on the aforementioned equation, the regression applicator 206 may reject any estimate that may be greater than 't'. As a result, over-fitting problems are averted. The estimates that are selected, that is the sales figures corresponding to the advertisement media which are selected are then added iteratively in conformance to AIC criterion given below.

$$\text{AIC} = -2(\text{log-likelihood}) + 2K \quad \text{AIC criterion}$$

where, K=Number of advertisement media plus intercept and Log-likelihood: Measure of model fit. In an example, the set of advertisement media are selected based on a model which is robust and has minimum AIC. That is, the advertisement media are added till the cumulative AIC value goes on decreasing. An example model 1 is depicted below.

Example Model 1

| Advertisement media | AIC |
|---|---|
| Intercept | 6750.381 |
| National TV | 6457.961 |
| Search | 6451.254 |
| Competitive Search | 6442.372 |
| TV_Attack | 6429.96 |
| Radio | 6419.703 |
| Print | 6419.414 |
| Brand Awareness | 6407.491* |
| Newspaper | 6409.315 |

In the example model 1 illustrated above, the advertisement media till brand awareness are selected as the cumulative AIC value goes on decreasing. Post brand awareness, the AIC value starts increasing again.

Figure 3A:
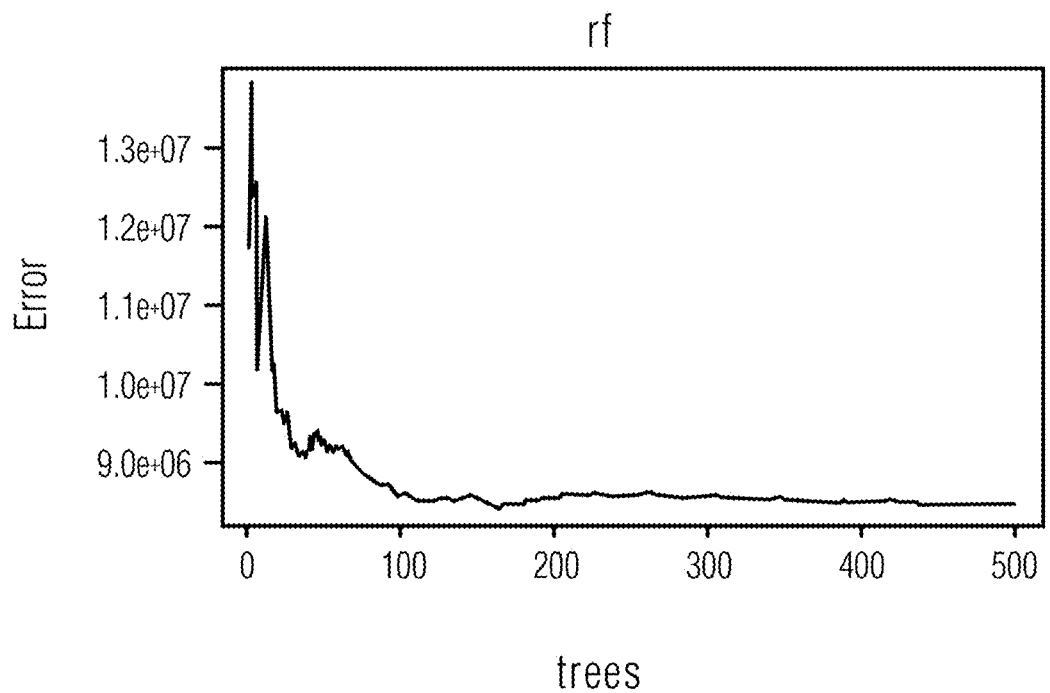
FIGS. 3(a) and 3(b) illustrate an implementation of the random forest regression technique, in accordance with the present disclosure.

In another example, when the advertisement media are in discrete form, the regression applicator 206 may use a random forest regression technique. The random forest regression technique is an ensemble learning technique for reducing errors. In the random forest regression technique, a plurality of decision trees are generated and an average output of individual trees is computed. In said technique, the sales are taken as dependent variables and the advertisement media are taken as nodes. The error rate is monitored and the number of trees is selected when the reduction in error is constant, for instance, as depicted in graph 1 shown in FIG. 3(a).

Figure 3B:
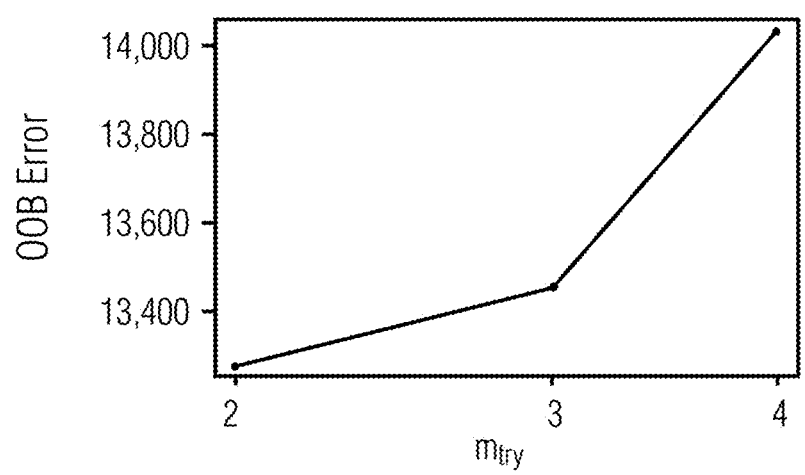

As may be observed, the regression applicator 206 may select the number of trees (ntree) to be equal to 100 as the reduction in error becomes constant. Subsequently, the trees may be split and the number of advertisement media selected at each split, hereinafter "mtry", may be determined based on minimum out of bag (OOB) error. The OOB error may be understood as the mean prediction error on each training sample $x_i$, using only the trees that did not have $x_i$ in their bootstrap sample. Continuing with the above example, based on the graph 2 shown in FIG. 3(b), the value of mtry may be determined to be three.

Subsequently, the regression applicator 206 computes prediction error, for example, mean squared error (MSE), for each tree. The MSE may be computed by taking a square of difference between the actual data and the predicted data. In one example, the difference is averaged over all the trees. Accordingly, the MSE in terms of percentage is obtained for each of the advertisement media, as depicted below in example table 16.

EXAMPLE TABLE 16

| Advertisement medium | MSE |
|---|---|
| National_TV | 5.26012 |
| Radio | 4.684573 |
| Search | 4.500345 |
| Print | 3.835894 |
| TV_Attack | 2.829506 |
| Comp_Paid_Search | 2.588429 |

In an example, the regression applicator 206 may select the regression technique based on a user input received through the interface 112.

Figure 4:
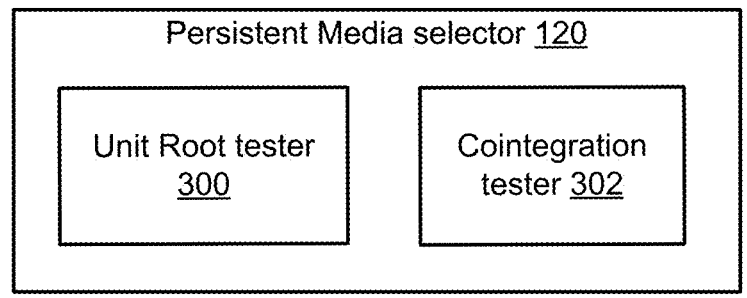
FIG. 4 illustrates an example of a persistent media selector, in accordance with the present disclosure.

FIG. 4 illustrates a block diagram depicting components of the persistent media selector 120. The persistent media selector includes a unit root tester 300 and a cointegration tester 302. As mentioned above, the persistent media selector 120 identifies the set of persistent advertisement media from the set of advertisement media.

In operation, for each of the set of advertisement media, the unit root tester 300 may determine whether the advertisement medium is stationary or evolving. In a case where the advertisement medium is stationary, the unit root tester 300 may discard the advertisement medium. On the other hand, if the advertisement medium is evolving, the unit root test medium 300 may identify the advertisement medium to be a persistent advertisement medium. That is, it is inferred that the advertisement media would have a long term or persistent effect on the sales of the product. For determining whether the advertisement medium is stationary or evolving, the unit root tester 300 performs a dickey fuller test and computes an observed value (Tau1), a critical value (Tau2), a p-value, and an alpha value for each of the advertisement media. Subsequently, an advertisement medium whose corresponding p-value is less than the corresponding alpha value is deemed to be stationary and discarded. For instance, in the example table 17, given below, the p-value of Radio is less than apha value for radio.

EXAMPLE TABLE 17

| | National TV | Search | Print | Radio |
|---|---|---|---|---|
| Tau1 (Observed value) | −2.87 | −3.12 | −1.45 | −5.14 |
| Tau1 (Critical value) | −3.45 | −3.45 | −3.45 | −3.45 |
| p-value | 0.21 | 0.1 | 0.06 | 0.01 |
| Alpha value | 0.05 | 0.05 | 0.05 | 0.05 |
| Inference | Non-Stationary | Non-Stationary | Non-Stationary | Stationary |

Thus, the Radio is deemed to be stationary and non-evolving. Whereas, as observed, National TV, Search, and print are deemed to be non-stationary, i.e., evolving.

The non-stationary advertisement media are subsequently fed as input to the cointegration tester 302. For each of the non-stationary advertisement media, the cointegration tester 302 ascertains whether a long term equilibrium exists between the advertisement medium and sales of the product, using equation 1 provided below.

$$Sales_t = A + BTV_t \qquad (1)$$

Using the equation 1, a regression is run between the advertisement medium, sample results of which are provided below in example table 18.

EXAMPLE TABLE 18

| Variable | Coefficient | Std_error | T-stat | P-value |
|---|---|---|---|---|
| Intercept (A) | −0.390957 | 0.097112 | −4.026 | 0.00008 |
| National_TV (B) | 0.821951 | 0.0117602 | 69.893 | <0.00001 |

The sample Table 18 illustrated above indicates regression results for National TV.

Post regression, the cointegration tester 302 calculates residuals for the advertisement media and determines whether the residuals are stationary or not. In a case where the residuals are stationary, the advertisement medium is deemed to be cointegrated with the sales and is included in the set of persistent advertisement media. On the other hand, if the residual is non-stationary, it is determined that the advertisement media and the sales are not cointegrated and the advertisement media is not included in the set of persistent advertisement media.

FIG. 5 illustrates a screenshot of an exemplary GB network, in accordance with the present subject matter. As can be seen in the figure, relationships between the advertisement media and sales may be direct, indirect, or both. For instance, National TV has both, direct and indirect, relationship with the sales. On the other hand, TV attack has only direct relationship with the sales.

Figure 6:
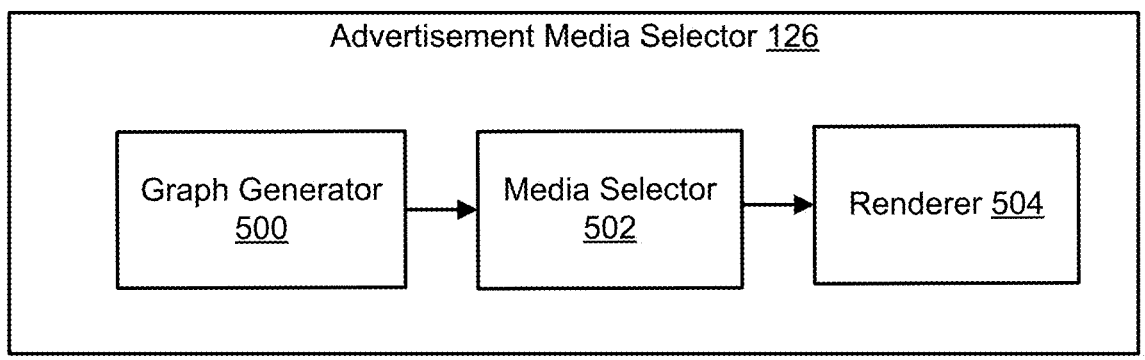
FIG. 6 illustrates an example of a advertisement media selector, in accordance with the present disclosure.

FIG. 6 illustrates a block diagram depicting components of the advertisement media selector 126. The advertisement media selector 126 includes a graph generator 500, a media selector 502, and a renderer 504. The graph generator 500, in an example, generates one or more graphs for displaying to a vendor. The graphs, in an example include the a timeline based predicted sales decay of the product. Exemplary graphs are depicted in FIGS. 7(a) and 7 (b).

Based on the graphs, the vendor may select the persistent advertisement medium, in an example. In another example, the media selector 502 may select automatically select the persistent advertisement medium having the highest corresponding PS value. Subsequent to the selection, the media selector 502 may select the advertisement to be rendered and the advertisement platform. Thereafter, the renderer 504 may render the advertisement on the persistent advertisement medium.

Figure 7A:
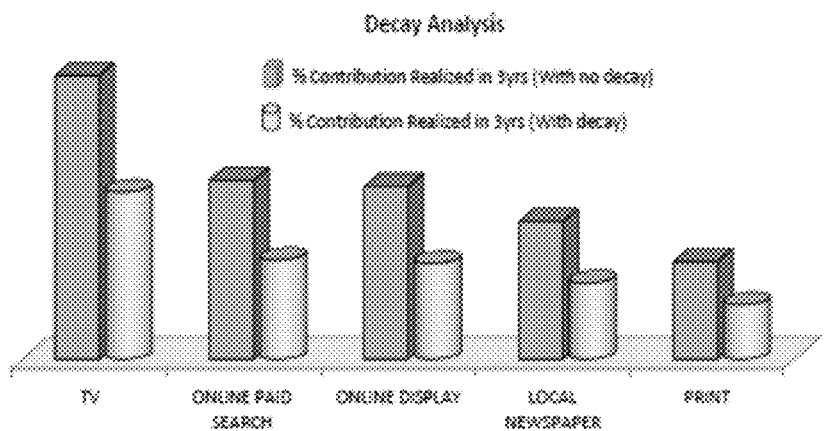
FIGS. 7(a) and 7(b) illustrates example graphs, in accordance with the present disclosure.
Figure 7B:
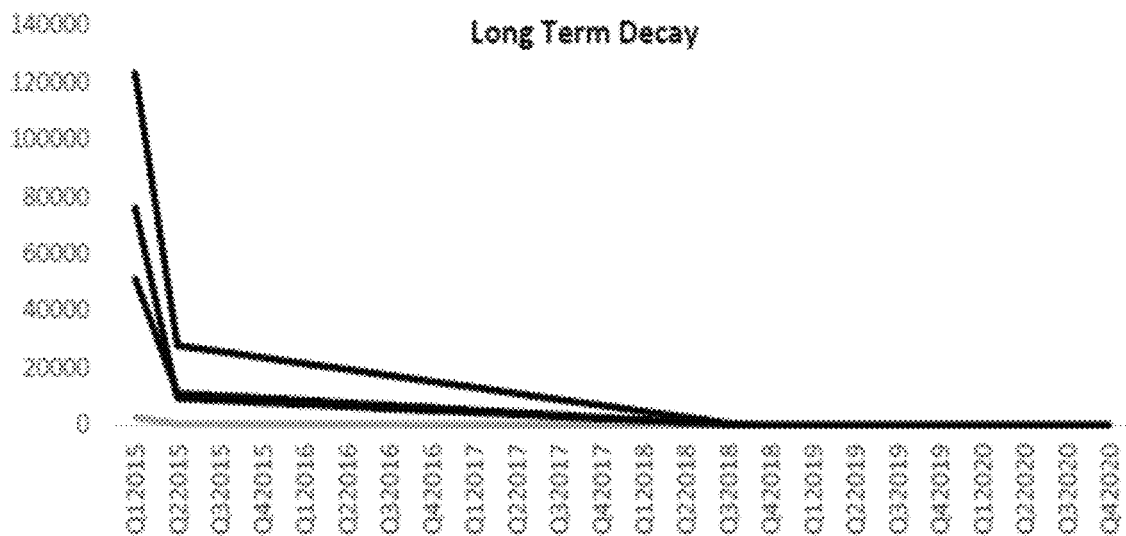

FIGS. 7(a) and 7(b) illustrate sample graphs generated by the graph generator 500. FIG. 7(a) illustrates a sample graph depicting predicted sales value (with and without decay) for a plurality of advertisement media for a defined period of three years. FIG. 7(b) illustrates a quarterly breakup of predicted sales through a plurality of advertisement media for a predefined period of five years.

Figure 8:
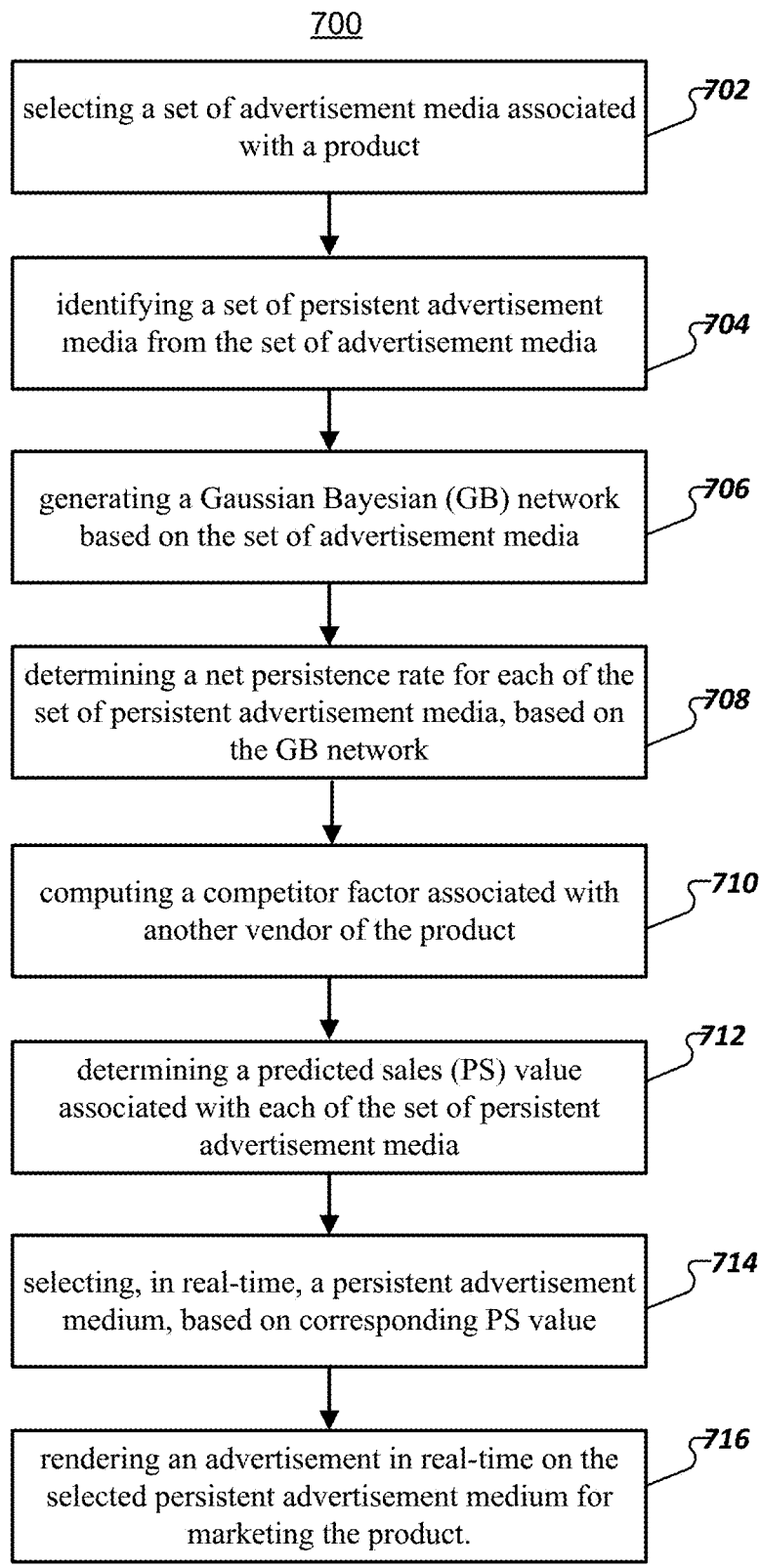
FIG. 8 illustrates an example of a method for rendering advertisement, in accordance with the present disclosure.

FIG. 8 shows a flowchart 700 that details one example of advertisement rendering. The method begins at 702 wherein a set of advertisement associated with a product are selected. The set of advertisement media may include those advertisement media which are significantly related to the sales of the product. In an example, the selection may be done using one of a lasso regression technique or a random forest technique.

At 704, a set of persistent advertisement media is identified from the set of advertisement media. The set persistent advertisement media includes advertisement media which have Long term impact on the sales of the product. In an example, a unit root test, followed by a cointegration test may be performed for identifying the set of persistent advertisement media.

At 706, a Gaussian Bayesian (GB) network is generated based on the set of advertisement media. The GB network is indicative of relationships between the set of advertisement media and the sales of the product. The relationships may be either direct or indirect and an advertisement medium may have both the relationships with the sales.

At 708, a net persistence rate for each of the set of persistent advertisement media is determined based on the GB network. The net persistence rate is indicative of the sales generated due to persistence of the advertisement media and may be determined in the manner as described above.

At 710, a competitor factor associated with another vendor of the product is computed. In an example, both, media mix competitor model and competitor only model may be used for computing the competitor factor.

At 712, a predicted sales (PS) value associated with each of the persistent advertisement media is determined. The PS value of an advertisement medium is indicative of a predicted sale of the product for a further time period when the product advertised through the persistent advertisement medium. The PS value is computed in a manner as described above.

At 714, a persistent advertisement medium is selected in real time based on the corresponding PS value. In an example, the persistent advertisement medium with the highest PS value is selected. In an example, the selection may be one of automatic or user selected.

At 716, an advertisement corresponding to the product is rendered in real time on the selected persistent advertisement medium for marketing the product. In an example, an advertisement platform may too be selected prior to rendering the advertisement. For instance, for print, newspaper may be selected.

Figure 9:
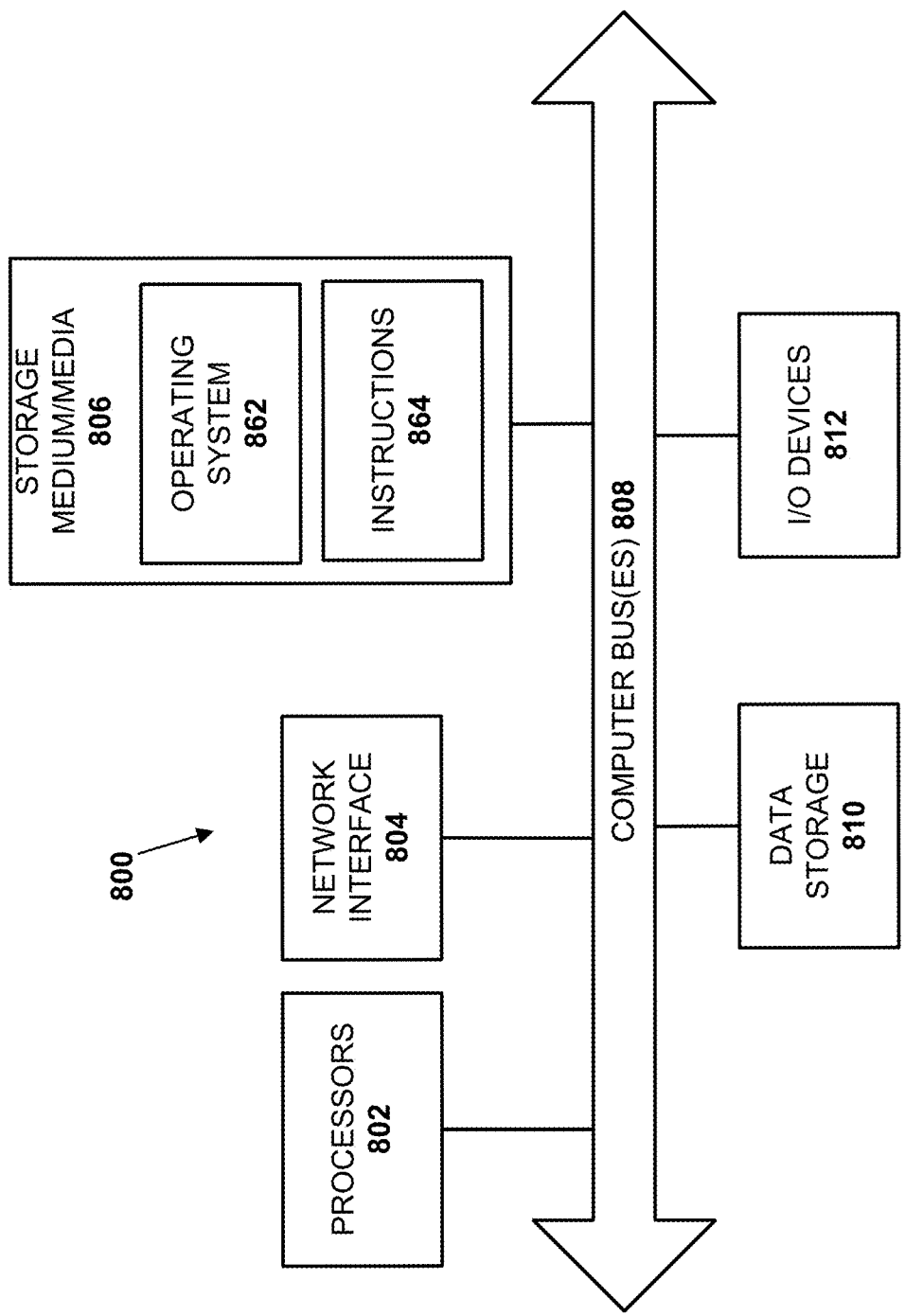
FIG. 9 illustrates an example of a computer platform, in accordance with the present disclosure.

FIG. 9 illustrates a computer system 800 that may be used to implement the system 102. The computer system 800 may include additional components not shown and that some of the components described may be removed and/or modified. The computer system 800 may be a server or the system 80 may be implemented in a distributed computing system on a plurality of servers. Each server may include the components of the computer system 800.

The computer system 800 includes processor(s) 802, such as a central processing unit, ASIC or other type of processing circuit, input/output devices 812, such as a display, mouse keyboard, etc., a network interface 804, such as a Local Area Network (LAN), a wireless 802.11x LAN, a 3G or 4G mobile WAN or a WiMax WAN, and a computer-readable medium 806. Each of these components may be operatively coupled to a bus 808. The computer readable medium 806 may be any suitable medium which participates in providing instructions to the processor(s) 802 for execution. For example, the computer readable medium 806 may be non-transitory or non-volatile medium, such as a magnetic disk or solid-state non-volatile memory or volatile medium such as RAM. The instructions or modules stored on the computer readable medium 806 may include machine readable instructions 864 executed by the processor(s) 802 to perform the methods and functions of the system 102.

The system 102 may be implemented as software stored on a non-transitory computer readable medium and executed by one or more processors. For example, the computer readable medium 806 may store an operating system 862, such as MAC OS, MS WINDOWS, UNIX, or LINUX, and the like for the system 102. The operating system 862 may be multi-user, multiprocessing, multitasking, multithreading, real-time and the like. For example, during runtime, the operating system 862 is running and the code for the system 102 is executed by the processor(s) 802.

The computer system 800 may include a data storage 810, which may include non-volatile data storage. The data storage 810 stores any data used by the system 102. The data storage 810 may be used to store the datastore 114 and may be hosted by separate database servers.

The network interface 804 connects the computer system 800 to internal systems for example, via a LAN. Also, the network interface 804 may connect the computer system 800 to the Internet. For example, the computer system 800 may connect to web browsers and other external applications and systems via the network interface 804.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

We claim:

1. A method for rendering an advertisement on an advertisement medium for marketing of a product of a vendor, the method comprising:
  digitally collecting product data indicative of advertisement and sales related to the product;
  determining a plurality of advertisement media associated with the product based on the digitally collected product data and one or more transformation rules; and
  analyzing the determined plurality of advertisement media to select a set of advertisement media associated with the product based on a regression technique;
  identifying a set of persistent advertisement media from the set of advertisement media based on one or more tests, wherein the set of persistent advertisement media comprises the advertisement media having long term equilibrium relationship with sales of the product;
  generating a Gaussian Bayesian (GB) network based on the set of advertisement media, wherein the GB network is indicative of at least one of a direct relationship and an indirect relationship between the set of advertisement media and the sales of the product;
  computing a short term contribution for each of the set of persistent advertisement media based on sales data associated with the advertisement medium, the sales data being indicative of a number of products sold during a defined time period due to marketing done through the advertisement medium;
  computing a net short term contribution for each of the set of persistent advertisement media based on the short term contribution of the corresponding advertisement media and a short term decay, wherein the short term decay is based on an adstock associated with the corresponding advertisement media;
  computing a persistence rate for each of the persistence advertisement media based on a level value of the corresponding advertisement media and a difference value in sale of the products between the defined time period;
  determining a net persistence rate for each of the set of persistent advertisement media, based on the persistence rate of the corresponding advertisement media and the net short term contribution of the corresponding advertisement media;
  computing a competitor factor associated with another vendor of the product based on a first competitor model and a second competitor model, the first competitor model being independent of the sales of the product achieved by the vendor, and the second competitor model being dependent of the sales of the product achieved by the vendor;
  determining a predicted sales (PS) value associated with each of the set of persistent advertisement media, based on at least the corresponding net persistence rate, sales data associated with the advertisement medium and the competitor factor, wherein the PS value associated with a persistent advertisement medium is indicative of a number of the products predicted to be sold by a further time period when the product is advertised through the persistent advertisement medium, and wherein the further time period comprises a first time period and a second time period, and wherein the determining the PS value comprises:
    computing at least one variable decay value based on the competitor factor and the adstock value associated with the advertisement medium;
    computing at least one updated unit persistence contribution during the first time period based on the unit persistence contribution and the variable decay value;
    computing at least one further updated unit persistence contribution during the second period based on the at least one updated unit persistence contribution and the competitor factor; and
    computing the PS value based on the at least one updated unit persistence contribution during the first time period and the at least one further updated unit persistence contribution during the second time period;
  selecting, in real-time, a persistent advertisement medium, from the set of persistent advertisement media, based on the corresponding PS value of the persistent advertisement medium for marketing the product;
  when the PS value of the selected persistent advertisement medium is greater than a threshold value, modifying the advertisement in real-time to remove access graphics and streaming via video the modified advertisement in real-time on the selected persistent advertisement medium for marketing the product, wherein the selected persistent advertisement medium includes at least one of a television and a website; and
  when the PS value of the selected persistent advertisement medium is less than or equal to the threshold value, streaming via video the advertisement in real-time on the selected persistent advertisement medium for marketing the product, wherein the selected persistent advertisement medium includes at least one of a television and a website.

2. The method as claimed in claim 1, wherein the one or more tests comprise at least one of a unit root test, a dickey fuller test, and a co-integration test.

3. The method as claimed in claim 1, wherein the regression technique is one of a Lasso regression technique and a random forest variable selection technique.

4. The method as claimed in claim 1, further comprising selecting, in real-time, an advertisement platform associated with the advertisement medium for rendering the advertisement related to the product based on a decay rate of the selected persistent advertisement medium for marketing the product.

5. A system for rendering an advertisement on an advertisement medium for marketing of a product of a vendor, the system comprising:
  a hardware processor;
  a memory to store machine readable instructions for a data processor, a persistent media selector; a co-relator; an advertisement media modeler; an advertisement media selector, and a renderer;
  the data processor, wherein the machine readable instructions for the data processor are executable by the hardware processor to:
    digitally collect product data indicative of advertisement and sales related to the product;

determine a plurality of advertisement media associated with the digitally collect product based on product data associated with the product and one or more transformation rules; and analyze the determined plurality of advertisement media to select a set of advertisement media associated with the product based on a regression technique;

the persistent media selector, wherein the machine readable instructions for the persistent media selector are executable by the hardware processor to identify a set of persistent advertisement media from the set of advertisement media based on one or more tests, wherein the set of persistent advertisement media comprises advertisement media having long term equilibrium relationship with sales of the product;

the co-relator, wherein the machine readable instructions for the co-relator are executable by the hardware processor to generate a Gaussian Bayesian (GB) network based on the set of advertisement media, wherein the GB network is indicative of at least one of a direct relationship and an indirect relationship between the set of advertisement media and the sales of the product;

the advertisement media modeler, wherein the machine readable instructions for the advertisement media modeler are executable by the hardware processor to:

compute a short term contribution for each of the set of persistent advertisement media based on sales data associated with the advertisement medium, the sales data being indicative of a number of products sold during a defined time period due to marketing done through the advertisement medium;

compute a net short term contribution for each of the set of persistent advertisement media based on the short term contribution of the corresponding advertisement media and a short term decay, wherein the short term decay is based on an adstock associated with the corresponding advertisement media;

computing a persistence rate for each of the persistence advertisement media based on a level value of the corresponding advertisement media and a difference value in sale of the products between the defined time period;

determine a net persistence rate for each of the set of persistent advertisement media, based on the persistence rate of the corresponding advertisement media and the net short term contribution of the corresponding advertisement media;

compute a competitor factor associated with another vendor of the product based on a first competitor model and a second competitor model, the first competitor model being independent of the sales of the product achieved by the vendor, and the second competitor model being dependent of the sales of the product achieved by the vendor; and determine a predicted sales (PS) value associated with each of the set of persistent advertisement media, based on at least the corresponding net persistence rate, sales data associated with the advertisement medium and the competitor factor, wherein the PS value associated with a persistent advertisement medium is indicative of a number of the products predicted to be sold by a further time period when the product is advertised through the persistent advertisement medium, and wherein the further time period comprises a first time period and a second time period, and wherein for the determination of the PS value the advertisement media modeler further is to:

compute at least one variable decay value based on the competitor factor and the adstock value associated with the advertisement medium;

compute at least one updated unit persistence contribution during the first time period based on the unit persistence contribution and the variable decay value;

compute at least one further updated unit persistence contribution during the second period based on the at least one updated unit persistence contribution and the competitor factor; and compute the PS value based on the at least one updated unit persistence contribution during the first time period and the at least one further updated unit persistence contribution during the second time period; and the advertisement media selector, wherein the machine readable instructions for the advertisement media selector are executable by the hardware processor to:

select, in real-time, a persistent advertisement medium, from the set of persistent advertisement media, based on the corresponding PS value of the persistent advertisement medium for marketing the product wherein when the PS value of the selected persistent medium is greater than a threshold value, the advertisement media selector modifies the advertisement in real-time to remove access graphics and the renderer, wherein the machine readable instructions for the renderer are executable by the hardware processor, streams via video the modified advertisement in real-time on the selected persistent advertisement medium for marketing the product, wherein the selected persistent advertisement medium includes at least one of a television and a website; and when the PS value of the selected persistent medium is less than or equal to the threshold value, the renderer streams via video the advertisement in real-time on the selected persistent advertisement medium for marketing the product, wherein the selected persistent advertisement medium includes at least one of a television and a website.

6. The system as claimed in claim 5, wherein the one or more tests comprise at least one of a unit root test, a dickey fuller test, and a co-integration test.

7. The system as claimed in claim 5, wherein the regression technique is one of a Lasso regression technique and a random forest variable selection technique.

8. The system as claimed in claim 5, wherein the advertisement media selector further is to select, in real-time, an advertisement platform associated with the advertisement medium for rendering the advertisement related to the product based on a decay rate of the selected persistent advertisement medium for marketing the product.

9. A non-transitory computer readable medium including machine readable instructions that are executable by at least one processor to:

digitally collect product data indicative of advertisement and sales related to the product;

determine a plurality of advertisement media associated with the product based on the digitally collected product data and one or more transformation rules; and analyze the determined plurality of advertisement media to select a set of advertisement media associated with a product based on a regression technique;

identify a set of persistent advertisement media from the set of advertisement media based on one or more tests, wherein the set of persistent advertisement media comprises advertisement media having long term equilibrium relationship with sales of the product;

generate a Gaussian Bayesian (GB) network based on the set of advertisement media, wherein the GB network is indicative of at least one of a direct relationship and an indirect relationship between the set of advertisement media and the sales of the product;

computing a short term contribution for each of the set of persistent advertisement media based on sales data associated with the set of advertisement media, the sales data being indicative of a number of products sold during a defined time period due to marketing done through the set of advertisement media;

computing a net short term contribution for each of the set of persistent advertisement media based on the short term contribution of the corresponding advertisement media and a short term decay, wherein the short term decay is based on an adstock associated with the corresponding advertisement media;

computing a persistence rate for each of the persistence advertisement media based on a level value of the corresponding advertisement media and a difference value in sale of the products between the defined time period;

determine a net persistence rate for each of the set of persistent advertisement media, based on the persistence rate of the corresponding advertisement media and the net short term contribution of the corresponding advertisement media;

compute a competitor factor associated with another vendor of the product based on a first competitor model and a second competitor model, the first competitor model being independent of the sales of the product achieved by the vendor, and the second competitor model being dependent of the sales of the product achieved by the vendor;

determine a predicted sales (PS) value associated with each of the set of persistent advertisement media, based on at least the corresponding net persistence rate and the competitor factor, wherein the PS value associated with a persistent advertisement medium is indicative of a number of the products predicted to be sold by a further time period when the product is advertised through the persistent advertisement medium, and wherein the further time period comprises a first time period and a second time period, and wherein the determining the PS value comprises:

computing at least one variable decay value based on the competitor factor and the adstock value associated with the advertisement medium;

computing at least one updated unit persistence contribution during the first time period based on the unit persistence contribution and the variable decay value;

computing at least one further updated unit persistence contribution during the second period based on the at least one updated unit persistence contribution and the competitor factor; and computing the PS value based on the at least one updated unit persistence contribution during the first time period and the at least one further updated unit persistence contribution during the second time period;

select, in real-time, a persistent advertisement medium, from the set of persistent advertisement media, based on the corresponding PS value of the persistent advertisement medium for marketing the product;

when the PS value of the selected persistent advertisement medium is greater than a threshold value, modifying the advertisement in real-time to remove access graphics and streaming via video the modified advertisement in real-time on the selected persistent advertisement medium for marketing the product, wherein the selected persistent advertisement medium includes at least one of a television and a website; and when the PS value of the selected persistent advertisement medium is less than or equal to the threshold value, streaming via video the advertisement in real-time on the selected persistent advertisement medium for marketing the product, wherein the selected persistent advertisement medium includes at least one of a television and a website.

* * * * *